United States Patent Office 2,950,261
Patented Aug. 23, 1960

2,950,261

PROCESS OF MAKING EXPANSIBLE PARTICULATE STYRENE POLYMER BY DIFFUSION OF A VOLATILE LIQUID HYDROCARBON INTO SAID POLYMER PARTICLES

Karl Buchholz, Ludwigshafen (Rhine), Fritz Stastny, Weinheim, Bergstrasse, and Rudolf Gaeth, Ludwigshafen (Rhine), Germany, assignors to Badische Anilin- & Soda-Fabrik Aktiengesellschaft, Ludwigshafen (Rhine), Germany No Drawing. Filed Sept. 8, 1954, Ser. No. 454,848

Claims priority, application Germany Sept. 25, 1953

7 Claims. (Cl. 260—2.5)

This invention relates to the production of expansible thermoplastics by treating a styrene polymer with a mixture of water and a volatile liquid aliphatic or cycloaliphatic hydrocarbon.

For the production of expansible thermoplastics, i.e. thermoplastics which are capable of being "foamed up" by heating, liquids of low boiling point which do not dissolve, but only swell, the plastics have already been proposed as raising agents. Volatile liquid aliphatic or cycloaliphatic hydrocarbons with boiling points which lie below the softening point of the polymer have proved suitable raising agents for styrene polymers. For the production of the polymer containing the raising agent, either a mixture of monomeric styrene with the liquid raising agent can be polymerized or the raising agent can be introduced into the finished polymer. When working by the latter method, the raising agent diffuses into the polymer. Although polystyrene and other styrene polymers are not soluble in the above-mentioned hydrocarbons, the particles of the said polymers swell so strongly therein that they soon cake together. The penetration of the raising agent into the polymer particles is thereby rendered difficult because the industrial handling of such agglomerated masses offers great difficulty.

We have now found, contrary to expectation, that expansible styrene polymers which do not stick together when treated with liquid raising agents can be prepared by treating fine-grained styrene polymers with mixtures of major amounts of water and minor amounts of volatile aliphatic or cycloaliphatic hydrocarbons in a closed vessel at elevated temperatures, preferably above 40° C., which are, however, below the softening point of the styrene polymer.

Although the liquid hydrocarbons used as raising agents are not miscible with water, it is possible with the aid of the said method to disperse the raising agent very uniformly in the styrene polymers. It is preferable to carry out the treatment of the styrene polymers with the mixtures of water and hydrocarbons under the pressure of a gas. Air, nitrogen, carbon dioxide, hydrogen or other indifferent gases, for example, are suitable for setting up the excess pressure. The pressure of these gases should generally range between 2 and 10 excess atmospheres and should preferably be 1 to 2 atmospheres higher than the vapor pressure of the liquid raising agent at the temperature of treatment. The temperature of treatment varies depending on the sofetening point of the styrene polymer and should preferably lie 5° to 20° C. below the softening temperature determined by the method of Vicat (see German Industrial Standard Din-Blatt 57302, Beuth Vertrieb-G.m.b.H., Berlin W 15).

The process may be carried out by first introducing water and the polymer particles into an autoclave provided with a stirrer. After heating to the desired temperature and compressing to the desired pressure, the hydrocarbon to be used as raising agent is pressed into the autoclave a little at a time or preferably continuously. In general for 100 parts by weight of the styrene polymer are used from 3 to 15 parts by weight of the liquid volatile hydrocarbon and from 100 to 1000 parts by weight of water. When the treatment is completed, the whole is cooled, the water removed and the product dried at low temperature, preferably below 50° C. The speed and shape of the stirrer are such that the particles of polymer are kept in vigorous movement throughout the whole course of the treatment.

For the better distribution of the hydrocarbon used as raising agent, a small amount of an emulsifier may be added to the water. All the usual emulsifying agents, as for example natural soaps, or synthetic wetting or emulsifying agents, can be used. About 0.1 to 8% by weight of emulsifying agent, with reference to the hydrocarbon, are used as a rule.

A better dispersion of the hydrocarbons in water is also obtained by the addition of organic liquids which are miscible with water and do not have a solvent or swelling action on the styrene polymer. It is preferable to dilute the hydrocarbon used as raising agent with this liquid before pressing it into the autoclave. Suitable diluents of this kind are for example lower aliphatic alcohols, such as methanol or ethanol, and also the monoethyl and monobutyl ethers of ethylene glycol.

The amount of this diluent can be varied at will; in general, however, a mixture of diluent and hydrocarbon in the ratio 1:1 is sufficient.

An emulsifier and a diluent may also be used together.

Besides polystyrene, there may also be used copolymers of styrene with numerous other compounds. Such compounds include for example esters, amides and nitriles of acrylic acid and their homologues alkylated in alpha-position, vinyl esters of aliphatic and aromatic carboxylic acids, N-vinyl compounds, such as N-vinylcarbazole, N-vinylimidazole and N-vinylcaprolactam, alpha-beta-unsaturated ketones, such as vinyl methyl or vinyl isopropyl ketone, alpha-methylstyrene and styrenes halogenated or alkylated in the nucleus. Two or more of these substances can also be simultaneously copolymerized with styrene. The copolymers of styrene should contain usually at least 50% by weight of styrene. Similarly mixtures of various polymers with styrene polymers can also be used for the process.

The softening point of the expansible body to be prepared can be extensively varied by these many possibilities of variation of the polymeric initial material.

The size of the polymer particles is only of subordinate importance for the process. Of course the duration of the treatment increases with the average size of the particles. Generally speaking polymer particles with a diameter of about 0.1 to 5 millimetres are used. Particles with a diameter of more than 10 millimetres are practically without importance for subsequent processing. If for any special purpose coarse particles which, by reason of their high speed of settlement, can no longer be sufficiently agitated by the stirrer, are to be treated by the said process, soluble salts can be added to the water in order to adjust the density of the aqueous medium to about that of the particles of the polymer.

Pentane, hexane, heptane, petroleum ether, cyclopentane, cyclohexane and other saturated aliphatic or cycloaliphatic liquid volatile hydrocarbons having preferably a boiling point below the softening point of the styrene polymer are of special interest as raising agents.

The foaming up of the styrene polymers containing raising agents prepared according to this invention is effected by heating to temperatures above the boiling point of the raising agent and the softening point of the styrene polymer. It is preferable to carry out the heating in moulds so that porous shaped articles can be produced in one operation.

The following examples will further illustrate this invention but the invention is not restricted to these examples. The parts are parts by weight.

*Example 1*

20,000 parts of water and 5,000 parts of polystyrene in the form of small particles having a diameter of 2 to 3 millimetres are introduced into a pressure-tight stirring autoclave. After the autoclave has been closed, 3 excess atmospheres of nitrogen are pressed in, the stirrer is started and the contents of the autoclave heated to 80° C. After an hour, the continuous pumping in of commercial pentane is commenced. 50 parts of pentane are pumped in hourly for a period of 10 hours. The autoclave is then kept at 80° C. for another 40 hours. It is then cooled, the pressure is released, the polystyrene particles filtered off by suction or centrifuged and blown with air at 30° C.

*Example 2*

An expansible polymer is prepared under the same working conditions as in Example 1 from 20,000 parts of water, 7.5 parts of alkyl sulfonate, 7,500 parts of a ground copolymer from 90% of styrene and 10% of acrylonitrile, and 900 parts of petroleum ether of the boiling range 40° to 50° C. 60 parts of petroleum ether are pumped in each hour. The drying of the product is effected at 40° to 45° C.

*Example 3*

20,000 parts of water containing 7.5 parts of a reaction product of 1 mol of octadecyl alcohol and 10 mols of ethylene oxide and 6,000 parts of a copolymer of 50% of styrene, 25% of acrylonitrile and 25% of N-vinylcarbazole in the form of small beads having a diameter of 0.1 to 2 millimetres are introduced into the same apparatus as in Example 1. The autoclave is closed and heated to 100° °C. while stirring and without pressing in a gas. Then 60 parts per hour of a mixture of cyclohexane and commercial pentane (1:1) are pressed in for 15 hours. The whole is then heated at 100° C. for a further 80 hours while stirring. After cooling and removing the water, the particles of the polymer are dried at 40° to 50° C.

*Example 4*

A copolymer of 95% of styrene and 5% of acrylic acid n-butyl ester is treated as in Example 1. The pentane used as raising agent is, however, mixed with an equal amount of glycol monoethyl ether.

*Example 5*

20,000 parts of water in which are dissolved 600 parts of sodium chloride and 50 parts of the sodium salt of dibutylnaphthalene sulfonic acid, and 7,500 parts of a copolymer of 85% of styrene and 15% of alpha-methyl-styrene in the form of small particles having a diameter of 2 to 4 millimetres are introduced into the apparatus described in Example 1.

After closing the autoclave and setting the stirrer in motion, 3 excess atmospheres of hydrogen are pressed in and the contents of the autoclave heated to 87° C. After an hour the addition of a mixture of 900 parts of a commercial petroleum ether fraction with a boiling range of 30° to 45° C. and 900 parts of methanol is commenced. 30 parts of this mixture are pressed in every 10 minutes so that after 10 hours 1800 parts of the mixture have been supplied to the autoclave. The contents of the autoclave are then kept at 85° C. for another 60 hours. After the usual working up, the product is blown dry with air at 30° C.

*Example 6*

A copolymer of 85 parts of styrene and 15 parts of vinyl isopropyl ketone is treated as in Example 1. The temperature of the treatment lies in this case, however, at 60° C.

*Example 7*

9,500 parts of polystyrene and 400 parts of polyethylene and 100 parts of polyvinyl isobutyl ether are homogeneously mixed on rollers and then granulated. 7,500 parts of this polymer mixture and 20,000 parts of water and 65 parts of sodium oleate are introduced into the apparatus described in Example 1. 6 excess atmospheres of nitrogen are pressed in and the whole heated to 80° C. while stirring. A mixture of 825 parts of pentane (commercial) and 400 parts of ethanol is then pumped in during a period of 12 hours. The whole is then heated for another 30 hours at 80° C. After cooling, the pressure is released and the polymer particles are separated from the water. Drying is effected by blowing with air at 30° C.

We claim:

1. In a process for the production of an expansible particulate styrene polymer by diffusing a volatile liquid hydrocarbon into fine particles of a styrene polymer, wherein said hydrocarbon is selected from the class consisting of aliphatic and cycloaliphatic hydrocarbons in which said polymer is insoluble and boiling below the softening point of said polymer, the improvement which comprises contacting said polymer particles in a closed vessel with a diffusion mixture in which said polymer is insoluble and consisting essentially of a major proportion of water and a minor proportion of said hydrocarbon, and maintaining said particles and said mixture in contact at a temperature above 40° C. and below the softening point of said polymer to diffuse said hydrocarbon into said particles.

2. In a process for the production of an expansible particulate styrene polymer by diffusing a volatile liquid hydrocarbon into fine particles of a styrene polymer, wherein said hydrocarbon is selected from the class consisting of aliphatic and cycloaliphatic hydrocarbons in which said polymer is insoluble and boiling below the softening point of said polymer, the improvement which comprises contacting said polymer particles in a closed vessel with a diffusion mixture in which said polymer is insoluble and comprising 100 to 1000 parts by weight of water and 3 to 15 parts by weight of said hydrocarbon per 100 parts by weight of said polymer, and maintaining said particles and said mixture in contact at a temperature above 40° C. and below the softening point of said polymer to diffuse said hydrocarbon into said particles.

3. The process defined in claim 2 wherein said mixture contains a water-soluble emulsifying agent in a proportion of about 0.1% to 8% by weight of said hydrocarbon.

4. The process defined in claim 2 wherein said diffusion mixture and polymer particles are maintained in an inert gas atmosphere under superatmospheric pressure.

5. The process defined in claim 2 wherein said hydrocarbon is petroleum ether.

6. The process defined in claim 2 wherein said hydrocarbon is pentane.

7. In a process for the production of expansible particulate polystyrene by diffusing a volatile liquid hydrocarbon into fine particles of polystyrene, wherein said hydrocarbon is selected from the class consisting of aliphatic and cycloaliphatic hydrocarbons in which said polystyrene is insoluble and boiling below the softening point of said polystyrene, the improvement which consists essentially in contacting said polystyrene particles in a closed vessel with a liquid diffusion mixture of 100 to 1000 parts by weight of water and 3 to 15 parts by weight of said hydrocarbon per 100 parts by weight of said polystyrene, and maintaining said particles and said mixture in contact at a temperature above 40° C. and below the softening point of said polystyrene to diffuse said hydrocarbon into said particles.

References Cited in the file of this patent

UNITED STATES PATENTS

| | | |
|---|---|---|
| 2,371,868 | Berg et al. | Mar. 20, 1945 |
| 2,373,347 | Schoenfeld | Apr. 10, 1945 |
| 2,386,995 | Wigal | Oct. 16, 1945 |
| 2,442,940 | Standinger et al. | June 8, 1948 |
| 2,450,436 | McSutire | Oct. 5, 1948 |
| 2,550,503 | Turnbull | Apr. 24, 1951 |
| 2,681,321 | Stastny et al. | June 15, 1954 |
| 2,744,291 | Stastny et al. | May 8, 1956 |
| 2,787,809 | Stastny | Apr. 9, 1957 |